United States Patent
Zhang et al.

(10) Patent No.: US 9,826,055 B2
(45) Date of Patent: Nov. 21, 2017

(54) METHOD, SERVER, USER TERMINAL, AND SYSTEM FOR PUSHING NOTIFICATION MESSAGE

(71) Applicant: Tencent Technology (Shenzhen) Company Limited, Shenzhen (CN)

(72) Inventors: Xiaolong Zhang, Shenzhen (CN); Qing Huang, Shenzhen (CN); Zhenan Guan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 477 days.

(21) Appl. No.: 14/259,711

(22) Filed: Apr. 23, 2014

(65) Prior Publication Data

US 2014/0324972 A1 Oct. 30, 2014

Related U.S. Application Data

(63) Continuation of application No. PCT/CN2013/090576, filed on Dec. 26, 2013.

(30) Foreign Application Priority Data

Apr. 28, 2013 (CN) .......................... 2013 1 0157431

(51) Int. Cl.
*G06F 15/173* (2006.01)
*H04L 29/08* (2006.01)

(52) U.S. Cl.
CPC .......... *H04L 67/2861* (2013.01); *H04L 67/26* (2013.01)

(58) Field of Classification Search
CPC ............................ H04L 67/2861; H04L 67/26
See application file for complete search history.

(56) References Cited

U.S. PATENT DOCUMENTS

2004/0128359 A1* 7/2004 Horvitz ................ G05B 19/404
709/207
2007/0011314 A1* 1/2007 Horvitz ................ G06Q 10/107
709/224

(Continued)

FOREIGN PATENT DOCUMENTS

| CN | 102316423 A | 1/2012 |
|---|---|---|
| CN | 102447647 A | 5/2012 |
| EP | 1841130 A1 | 10/2007 |

OTHER PUBLICATIONS

International Search Report for corresponding International Patent Application No. PCT/CN2013/090576, dated Mar. 27, 2014, pp. 1-4.

(Continued)

*Primary Examiner* — Karen Tang
(74) *Attorney, Agent, or Firm* — Brinks Gilson & Lione

(57) ABSTRACT

A method, server, user terminal, and system are disclosed for sending notification messages in the Internet communication filed. In the method: when detecting it needs to send a message to a target terminal, an application server detects a state of the signaling channel. When the signaling channel is in connected state, the application server sends a notification message to the target terminal through this signaling channel. When the signaling channel is in a disconnected state, the application server generates a notification request to a corresponding account of the target terminal and sends the notification request to the notification server so that the notification server pushes a notification message to the target terminal according to the notification request.

20 Claims, 5 Drawing Sheets

(56) References Cited

U.S. PATENT DOCUMENTS

| | | | | |
|---|---|---|---|---|
| 2009/0307715 | A1* | 12/2009 | Santamaria | G06F 9/4418 |
| | | | | 719/318 |
| 2010/0094985 | A1* | 4/2010 | Abu-Samaha | H04L 67/02 |
| | | | | 709/223 |
| 2010/0138501 | A1* | 6/2010 | Clinton | G06F 15/16 |
| | | | | 709/206 |
| 2011/0088051 | A1 | 4/2011 | Zhu et al. | |
| 2011/0176407 | A1* | 7/2011 | Campbell | H04W 76/064 |
| | | | | 370/216 |
| 2012/0157098 | A1 | 6/2012 | Singh et al. | |
| 2012/0210415 | A1* | 8/2012 | Somani | H04L 63/0884 |
| | | | | 726/9 |
| 2013/0047034 | A1* | 2/2013 | Salomon | H04W 4/00 |
| | | | | 714/18 |
| 2013/0111572 | A1* | 5/2013 | Gaddam | H04W 12/06 |
| | | | | 726/7 |
| 2014/0016457 | A1* | 1/2014 | Enyedi | H04L 45/16 |
| | | | | 370/225 |
| 2014/0056103 | A1* | 2/2014 | Virgin | G01V 1/22 |
| | | | | 367/76 |
| 2014/0280792 | A1* | 9/2014 | Sigoure | H04L 67/28 |
| | | | | 709/220 |
| 2016/0085650 | A1* | 3/2016 | Kadayam | G06F 11/2082 |
| | | | | 714/6.23 |

OTHER PUBLICATIONS

Office Action of the corresponding Chinese Patent Application No. 201310157431.4, dated Feb. 3, 2016, pp. 1-8.

Huawei et al., "Push Proxy/Device Agent Function for Reducing Heartbeat/Keep-Alive of Applications," 3GPP, Agenda Item 7.2.1, SA WG2 Meeting #96, San Diego, U.S., Apr. 2013, S2-131498, 4 pages.

Dynamic Android Notification Bar, weidi1989, printed from the internet at <http://blog.csdn.net/way_ping_li/article/details/8054416>, 2012, 6 pages.

Office Action dated May 10, 2016 for Chinese Application No. 201310157431.4, 8 pages.

* cited by examiner

METHOD, SERVER, USER TERMINAL, AND SYSTEM FOR PUSHING NOTIFICATION MESSAGE

CROSS-REFERENCE TO RELATED APPLICATIONS

This application is a continuation of International Application No. PCT/CN2013/090576, filed on Dec. 26, 2013, which claims priority to Chinese Patent Application No. 201310157431.4, filed on Apr. 28, 2013, which is hereby incorporated herein by reference in its entirety.

FIELD

This disclosure relates to the field of user terminal notification field, in particular to a method, server, user terminal and system for sending messages.

BACKGROUND

With continuous development of computer technology and network technology, people may send notification message to the users using corresponding procedure application via the server and network to remind users of new message or some to-do list etc. For example, APNS (Apple Push Notification Service) launched by U.S. Apple Inc. right includes specified message push server used for pushing notification message to the corresponding Apple users.

In the present technology, the push process of notification message includes: the user input application account and password including instant messaging in a user terminal to log in an existing application server; when application server detects that it needs to send notification message to a user corresponding to this application account, the application server will send the notification message content and the corresponding user information to the server such as message push server of APNS; after notification server receives the notification message, the corresponding user terminal may be found in the user information list which has obtained physical connection authentication and device token authentication and then the generated notification message may be sent to corresponding user terminal.

Inventors have found that when sending notification message through the existing method, a large number of notification message from various applications and each user terminal may be handled in notification servers such as message push server in APNS, there must exist delay or even failed send of notification message.

SUMMARY

The problem to be solved for the embodiment of the present disclosure is to provide a method, server, user terminal, and system for sending messages, which may more effectively reduce the delay and the transmission failure of notification message.

In a first aspect, the disclosure provides the push method of one kind notification message. In the method, when detecting it needs to send a message to a target terminal, an application server detects a state of the signaling channel. When the signaling channel is in a connected state, the application server sends a notification message to the target terminal through this signaling channel. When the signaling channel is in a disconnected state, the application server generates a notification request to a corresponding account of the target terminal and sends the notification request to the notification server so that the notification server pushes a notification message to the target terminal according to the notification request.

In a second aspect, the disclosure provides a server including a hardware processor and a non-transitory storage medium accessible to the hardware processor. The non-transitory storage medium includes the following modules implemented by the hardware processor: a detecting module configured to detect a state of a signaling channel between a server and a target terminal when there is a need to push a message to the target terminal; a first processing module configured to send the message to the target terminal via the signaling channel when the signaling channel is in a connected state; and a second processing module configured to generate a notification request to a corresponding account of the target terminal and send the generated notification request to a notification server when the signaling channel is in a disconnected state so that the notification server pushes a notification message to the target terminal according to the notification request In a third aspect, the disclosure provides a communication system including: an application server, a notification server, and a user terminal. The application server is configured to detect a state of a signaling channel between the application server and the user terminal when detecting that the application server needs to push a message to the user terminal; wherein application server sends the notification message to the user terminal through the signaling channel if the signaling channel is in a connected state; if the signaling channel is in a disconnected state, the application server generates a notification request on the corresponding account of the user terminal and send the notification request to the notification server. The notification server is configured to push notification message to the user terminal according to the notification request when receiving the notification request of the application server. The user terminal is configured to send a confirmation message to the application server after receiving the notification message sent from the application server or receiving the notification message sent from notification server.

BRIEF DESCRIPTION OF THE DRAWINGS

To better explain the scheme of the present disclosure, the accompanying drawings necessary for the illustration of example embodiments of the disclosure are briefly described below, and it is apparent to those of ordinary skill in the art that the accompanying drawings only illustrate some embodiments of the disclosure and that other drawings may be obtained according to the accompanying drawings without any innovative efforts.

DETAILED DESCRIPTION OF THE DRAWINGS

Figure 1:
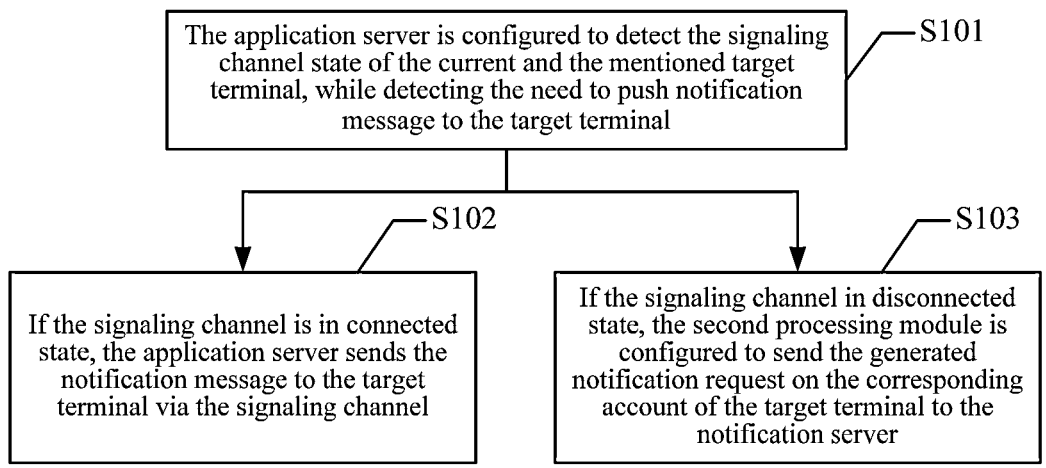
FIG. 1 is a flow diagram for a notification message push method of the embodiment of this present disclosure.

For a better understanding of the aim, schemes and advantages of the present disclosure, example embodiments are described in detail in connection with the accompanying drawings as follows.

Reference throughout this specification to "one embodiment," "an embodiment," "example embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an example embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The solutions in embodiment of the present disclosure will be clearly and completely described as follows combined with the attached figure of the embodiment of the present disclosure, apparently, the described embodiment is only part of the embodiments of the present disclosure, but not all embodiments. Based on the embodiment of this disclosure, all other embodiments acquired by the ordinary technicians in this field without creative work, may be in the protection scope of this disclosure.

Embodiment of the present disclosure may pass the detection on whether the signaling channel connected with the user terminal is connected. When connected, the application server will send a notification message to user terminal directly. When disconnected, the application server may require the server for sending notification message to the user terminal to send notification message to the user terminal, which may share part of notification processing burdens from the server for sending notification message to the user terminal and be better to reduce the delay of notification message and preferably avoid the transmission failed send of notification message.

FIG. 1 illustrates a schematic diagram for a notification message push method flow of this present disclosure. The push method in the embodiment of the present disclosure may be applied in various types of application server which requires to push notification message to the user terminal, specifically in scenes that various instant messaging application server sends new message prompt, to-do list prompt and other notification message to the user terminal for logging instant messaging application accounts. The methods include:

S101: The application server is configured to detect the signaling channel state of the current and the target terminal while detecting the need to push notification message to the target terminal;

In the S101, the application server may launch connected signaling in signaling channel through determining whether the corresponding instant messaging application is received from the target terminal. If receiving connected signaling, he application server determines that the current and the target terminal signaling channel is in a connected state. If no connected signaling is received, the application server determines that the signaling cannel is in a disconnected state. It may be further determined whether receive the connected signaling launched in the signaling channel by the corresponding instant messaging applications of the target terminals within the threshold value of the preset time period.

Target terminal is any user terminal that logged in instant messaging application and other application accounts. The application server will send notification message to the target terminal when it send new message to the target terminal or detected the to-do-list of the target terminal corresponding account happen etc. Whether the detection of application server needs to push notification message to the target terminal belongs to existing technology, and will not be repeated here.

The signaling channel is a control channel normally used by the user in network in order to ensure normal operation of the network, simple instructions may be sent in the signaling channel between application server and the target terminal.

After the user logs in the application server via application account on the target terminal, the signaling channel may be used as the channel sending "heartbeat signal" between the target terminal (such as instant messaging application) and application server, the target terminal may communicate with application server via the heartbeat connection mechanism so that the application server may determine that the user corresponding to this target terminal is the active user. Each other's state may be known through the "heartbeat signal" application server and the target terminal may determine whether the other side is able to receive and process the message, the application server may also know the communication addresses of target terminal and send message to the target terminal.

For example, the target terminal send to the application server at a certain time via a customized data structure (heartbeat packets or heartbeat frames) in order to make the application server determine that the target terminal corresponding to the application account is online to ensure that the validity of the connection between target terminal and the application server. In other words, in the embodiment of this disclosure, the application server may determine the signaling channel state of the current and the target terminal by detecting the normality of the heartbeat connection. The target terminal's signaling channel states include at least the connected state and disconnect state.

S102: If the signaling channel is in connected state, the application server sends the notification message to the target terminal via the signaling channel.

S103: If the signaling channel is in connected state, the second processing module is configured to send the generated notification request on the corresponding account of target terminal to the notification server when the signaling channel is in disconnected state so that the notification server may push notification message to the target terminal according to the notification request.

Here, the notification server may refer to the server that is configured to push notification message to the target terminal corresponding account, for example, the message-push server in the APNS.

When the current target terminal is connected with signaling channel of application programs, in the S102 application server may send a piece of notification message (i.e. Pseudo notification message) directly to the target terminal via the signaling channel may not via the dedicated notification server (such as the message push server in APNS) which may push notification message to the corresponding account of the target terminal.

Soon afterwards the user opens the corresponding application in the target terminal foreground, the specific news or to-do list data will be sent to the user terminal and displayed to the user by the target terminal via the application program. And if the signaling channel connection of target terminal and application program is disconnected, then in the S103 application server needs to send notification message to the target terminal via the notification server, such as the message push server in APNS. After the user opens the corresponding application in the target terminal foreground, the specific news or to-do list data will be sent to the target terminal and displayed to the user by the target terminal via the application program.

Embodiment of the present disclosure may pass the detection on whether the signaling channel connected with the user terminal is connected, and when connected, the application server will send a notification message to user terminal directly, when disconnected, it may require the server for sending notification message to the user terminal to send notification message to the user the terminal, which may share part of notification processing burdens from the server for sending notification message to the user terminal and be better to reduce the delay of notification message and preferably and avoid the transmission failed send of notification message.

Figure 2:
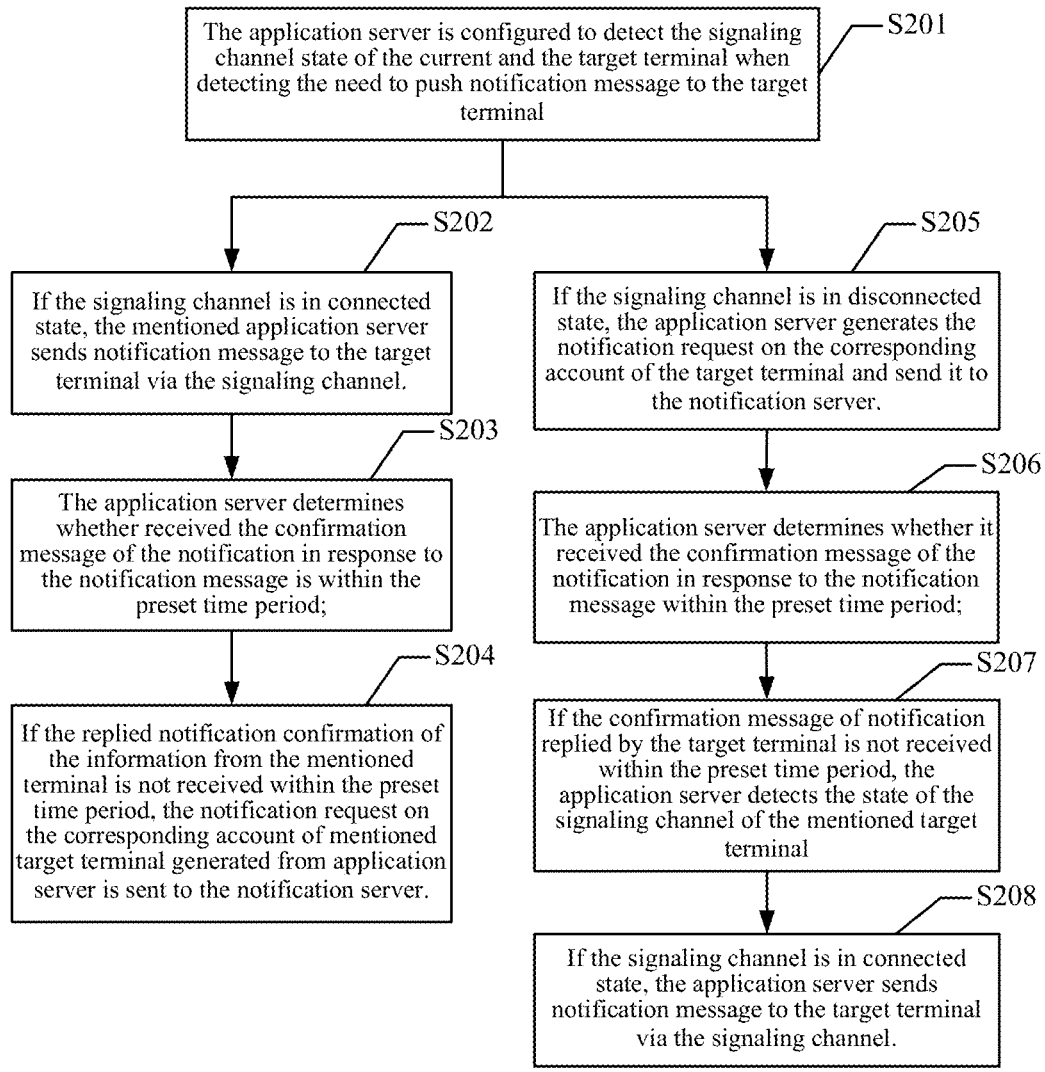
FIG. 2 is a flow diagram for another notification message push method of the embodiment of this present disclosure.

FIG. 2 is a flow diagram for a notification message push method of the embodiment of the present disclosure. The push method in the embodiment of the present disclosure may be applied in various types of application server which requires to push notification message to the user terminal. For example, it may be applied in scenes that various instant messaging application server sends new message prompt, to-do list prompt and other notification message to the user terminal for logging instant messaging application accounts. The methods include:

S201: The application server is configured to detect the signaling channel state of the current and the target terminal while detecting the need to push notification message to the target terminal.

Detecting whether it needs to push notification message to the target terminal and if it may be achieved by adopting the existing technology, in this disclosure embodiments, the S201 may include:

When detecting it needs to push notification message to the target terminal, it may determine whether the heartbeat connection with the target terminal is normal; if the heartbeat connection is normal, the state of signaling channel of current and target terminal may be determined and confirmed as connected state, when it is in the connected state, the following S202 may be performed, if the heartbeat connection is abnormal and it is in disconnected state, the following S205 may be performed. Among which, determining whether the heartbeat connection is normal may be achieved by using the existing technology.

S202: If the signaling channel is in the connected state, the application server sends notification message to the target terminal via the signaling channel.

S203: The application server is configured to determine whether received the confirmation message replied by the target terminal in response to the notification message is within the preset time period;

After sending the notification message to the target terminal in the S202, it will cause the notification message will be not sent correctly to the target terminal due to the network or the user terminal. Thus, the reception confirmation mechanism may be set in the embodiment of the present disclosure, i.e. after the user terminal receives the notification message (pseudo notification message) sent directly from the application server via signaling channel, the confirmation message may be replied to the application server. After receiving the notification message sent directly by the application server via the signaling channel and successfully display the prompts to the user, the user terminal may also reply confirmation message of notification to the application server. If the notification message is not received or having no normal prompts after receiving, the user terminal will not auto-response confirmation message of notification.

When application server receives the replied confirmation message of notification from the target terminal in response to the notification message, the same as with the existing technology, the corresponding information or to-do list or other data may be sent, when the confirmation message of notification is not received, the following S204 may be performed.

S204: If the replied confirmation message from the target terminal were not received within the preset time period the generated notification request on the corresponding account of target terminal may be sent to the server notification message. So that the notification server may push notification message to the target terminal in accordance with the notification request.

Application server may start timekeeping when sending notification message to target terminal via this signaling channel. If within a preset time period, for example within 3 seconds, the replied confirmation message of notification from target terminal is not received, the application server may determine that the transmission of notification message is failed via signaling channel, the S204 may be performed. the generated notification request on corresponding account of the target terminal may be sent to the notification server so that the notification server may push notification message to the target terminal in accordance with the notification request.

S205: If the signaling channel is in disconnected state, the application server notification request generated on the corresponding accounts of the target terminal may be sent to he notification server so that the notification server may push notification message to the target terminal according to the notification request.

Among which, in the S204 or S205 in the embodiment of the present disclosure, the generated notification request on corresponding account of the target terminal may be sent to the notification server, including: obtain notification content data about the corresponding account of target terminal and generate notification request of notification content data including corresponding account of the target terminal; the notification request including notification content data on the corresponding account of the target terminal may be sent to the notification server. The notification content data obtained include; obtaining the notification content that the user has a new message, or the notification content that the users has some thing to-do list. Application server sends the corresponding notification contents to the APNS and other notification server, and the notification server generates the corresponding notification message which will be sent to the target terminal.

Further optionally, after the performance of the S205, the method may further include:

S206: The application server is configured to determine whether it received the confirming message of notification replied by the target terminal in response to the notification message within the preset time period;

S207: If the confirmation message of notification replied by the target terminal is not be received within the preset time period, the application server detects the state of the signaling channel of the target terminal;

S208: If the signaling channel is in connected state, the application server sends notification message to the target terminal via the signaling channel.

In the embodiment of present disclosure, after sending the notification message to the target terminal via notification server, the terminal feedback mechanism may also be configured to determine whether the user terminal receives the notification message, when the confirmation message of notification for response from the target terminal, the state of signaling channel connected with the target terminal may also be re-detected, since the corresponding instant messaging applications in the target terminal may possibly launch connected signaling (i.e. heartbeat signaling) at this time in the signaling channel, therefore, the application server may detect and confirm the state of signaling channel connected with the target terminal as connected state, the application server may send this notification message to the target terminal via the signaling channel.

Figure 3:
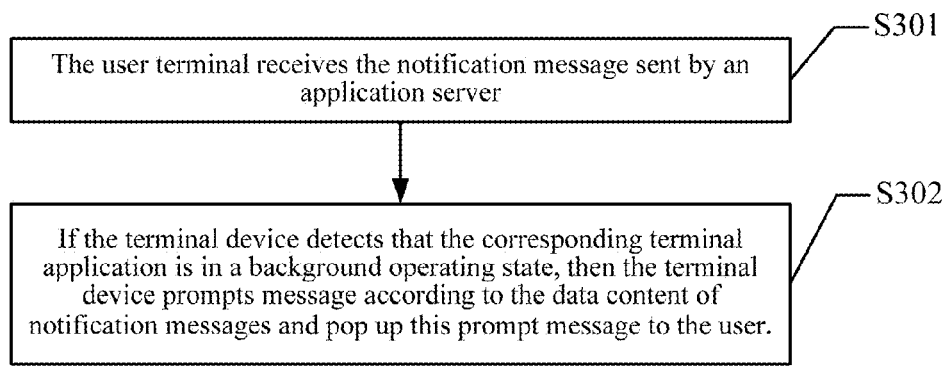
FIG. 3 is a flow diagram for a notification message prompt method of the embodiment of this present disclosure.

Embodiment of the present disclosure may pass the detection on whether the signaling channel connected with the user terminal is connected, and when connected, the application server will send a notification message to user terminal directly, when disconnected, it may require the server for sending notification message to the user terminal to send notification message to the user the terminal, which may share part of notification processing burdens from the server for sending notification message to the user terminal and be better to reduce the delay of notification message preferably and avoid the transmission failures of notification message. Further, after the notification message is sent, it may determine whether the notification message is successfully sent based on whether the confirmation message feed back from the user terminal is received, after a successful sending, the notification processing may be made, then after it is confirmed the sending is not successful, it may send notification message to the user terminal via the server used for sending notification message to user terminal, which better ensures the notification message may be sent to the user terminal FIG. 3 illustrates a flow diagram for a prompt method of the notification message of this present disclosure. the methods in the embodiment of the present disclosure may be applied in various types of applications which requires to push notification message to the user terminal. The user terminal may display the pushed notification message to the user through implementing the method in the embodiment of the present disclosure, specially, the method in the embodiment of the present disclosure includes:

S301: User terminal receives the notification message sent from an application server. The notification message may be the notification message sent from the application server to the terminal via signaling channel connected with the terminal.

User terminal may determine whether the notification message is the notification message sent to the terminal by the corresponding application server via the signaling channel connected with the terminal according to the equipment identification of notification message terminal such as IP address and transmission channel.

S302: If the terminal device detects that the corresponding terminal application is in a background operating state, then the terminal device may prompt message according to the data content of notification messages and pop up this prompt message to the user.

The user terminal may be the target terminal of the above-mentioned embodiments.

And if it is the corresponding instant messaging application and the user terminal is currently in screen lock state or the user is currently processing other events, the user terminal will run in background and construct a simple prompt information tips according to the data content of the notification message and pop up the prompt message prompt to the user.

If detecting the corresponding client application is in the state of foreground running, the user terminal will not display the notification message; that is, the user is currently in the client application's user interface, such as user session interface of corresponding instant messaging applications, the specific message or the specific to-do list data corresponding to this notification message sent from the application server will be received and displayed directly for displaying to the user, including: it displays the application server sends a message after the notification message and moves the message and conversation to the top of communication list.

Furthermore, after the user terminal receiving the notification message sent by the application server, further including: send the confirmation message of notification to the application server. In order to determine that its notification message is sent successfully by the notification application server, on the contrary, if the user terminal does not receive the notification message sent from the application server, the confirmation message of notification will not be replied, the application server may send notification message to the user terminal via the notification server according to needs.

And if the user terminal receives such notification message which is sent from APNS and other notification server, then the processing processes of received notification message will be the same with the existing technology, which will be not repeated herein.

The user terminal may directly receive notification message via the signaling channel, which may better ensure timely warning of the notification message and the feedback mechanism further ensures when the user terminal does not receive the notification message in signaling channel, it may also receive the notification message from the application server via server configured to send notification message to the user terminal, may also further ensure the timely warning of notification message, better reduce the delay of notification message and avoid the transmission failures of notification message.

Hereinafter, the server, user terminal and the system of the prevent disclosure embodiment are described in detail.

Figure 4:
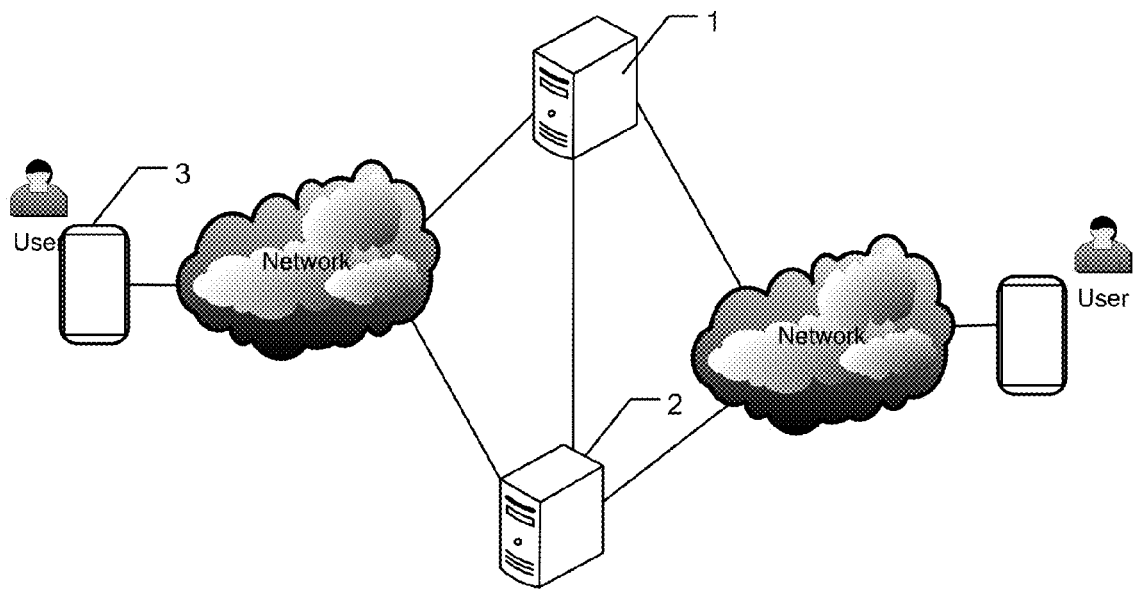
FIG. 4 is the structural diagram for a notification message pushing system of the embodiment of this present disclosure.

FIG. 4 illustrates the structure diagram of one notification message push system in the embodiment of the present disclosure. The system in the embodiment of the present disclosure includes: an application server 1, the notification server 2, and at least one user terminal. The embodiment of the present disclosure will indicate as the user terminal 3 among which, other user terminals will perform the same operation, wherein, the notification server is the server configured to push notification message to the corresponding account of the target terminal, which may also be the message push server in APNS.

The application server 1 is configured to detect the signaling channel state of current user terminal 3 when detecting it needs to push notification message to user terminal 3; if the signaling channel is in connected state, the notification message may be sent to user terminal 3 via this signaling channel; if the signaling channel is in disconnected state, the generated notification request on the corresponding account of user terminal 3 may be sent to the notification server 2;

The notification server 2 is configured to push notification message to the user terminal 3 according to the notification request when receiving the notification request of the application server 1;

The user terminal 3 is configured to prompt the content of the notification message to the users when receiving the notification message sent from the application server 1 or receiving the notification message sent from notification server 2.

The user terminal 3 When the user terminal 3 receiving the notification message sent by the notification server 2, execute the same operation with the existing technologies in order to prompt the content of the notification message to the user.

But when receiving the notification message sent from the application server 1, the user terminal 3 is configured to directly receive and display the information sent subsequently from application server 1 if detecting the corresponding client application is in the foreground running state and does not display the notification message; if detecting the corresponding client application is in client background running state, the prompt information will be structured according to the data content of the notification message and popped up to the user.

In addition, the user terminal 3 is also configured to send the confirmation message of notification to the application server 1 after receiving the notification message sent by the application server.

The application server 1 is also configured to determine whether the replied confirmation message of notification from one user terminal 3 in response to the notification message is received within the preset time period when sending notification message to the user terminal 3 via the singling channel connected with the user terminal; if within the preset time period, the replied confirmation message from one user terminal 3 is not received, the generated notification request on corresponding account of the user terminal 3 may be sent to the notification server 2.

Figure 5:
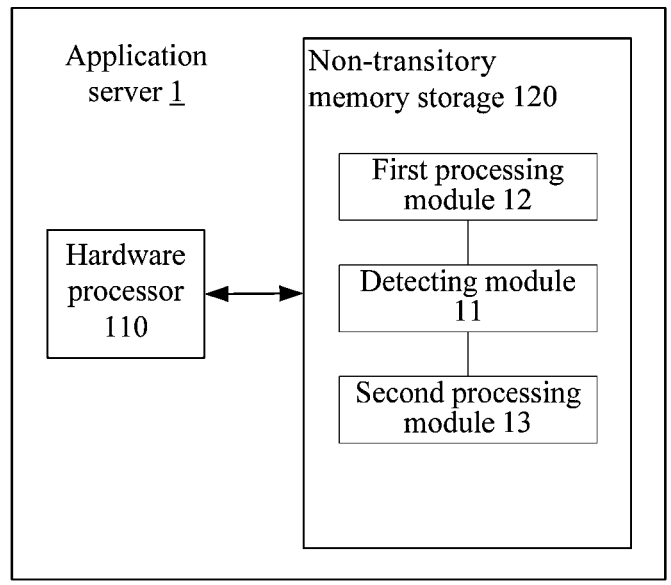
FIG. 5 is a structural diagram of a server used for notification message pushing of this present disclosure.

Embodiment of the present disclosure may pass the detection on whether the signaling channel connected with the user terminal is connected, and when connected, the application server will send a notification message to user terminal directly, when disconnected, it may require the server for sending notification message to the user terminal to send notification message to the user terminal, which may share part of notification processing burdens from the server for sending notification message to the user terminal and preferably reduce the delay and the failed sending of notification message. Further, after the notification message is sent, it may determine whether the notification message is successfully sent based on whether the confirmation message feedback from the user terminal is received, after a successful sending, the notification processing may be made, then after it is confirmed the sending is not successful, it may send notification message to the user terminal via the server used for sending notification message to user terminal, which better ensures the notification message may be sent to the user terminal FIG. 5 illustrates the structure diagram of one server used for notification message pushing in the embodiment of the present disclosure, the server in the embodiment of the present disclosure may be the application server 1 corresponding to the above FIG. 4. For example, the server 1 may include a hardware processor 110 and a non-transitory storage medium 120. The non-transitory storage medium 120 is configured to store the following modules which may direct the processor to perform corresponding acts:

A detecting module 11 is configured to detect the signaling channel state of the current and the target terminal, while detecting the need to push notification message to the target terminal.

A first processing module 12 is configured to send notification message to the target terminal via the signaling channel, if it is in connected state.

A second processing module 13 is configured to send the generated notification request on the corresponding account of the target terminal to the notification server when the signaling channel is in disconnected state so that the notification server may push notification message to the target terminal according to the notification request.

The target terminal refers to any user terminal which logged in instant messaging application and other applications account, for example, the user terminal 3 is in the corresponding embodiment of the FIG. 4. If the detection module 11 sends the new message to the target terminal or detecting there is to-do list on the corresponding application account of target terminal, the notification message will be sent to the target terminal. The application server detects the needs to push notification message to the target terminal by the detection module 11; it belongs to existing technology, and will not be repeated herein.

For the detecting of the state of the signaling channel for current and the target terminals, the detection module 11 may determine the state of the current signaling channel and the target terminals through checking whether the heartbeat connection is normal. The target terminal's signaling channel states include at least the connected state and disconnect state.

When the current target terminal is connected with signaling channel of application programs, the first processing module 12 may directly send a notification message (i.e. the notification message sent in this method is a pseudo notification message) to the target terminal via the signaling channel and the notification message may not be sent via the dedicated notification server (such as the information push server in APNS) which may push notification message to the corresponding account of the target terminal. Soon after the user opens the corresponding application in the user terminal foreground, the specific news or to-do list data will be sent to the user terminal and displayed to the user by the user terminal via the application program.

And if the signaling channel connection of target terminal and application program is disconnected, then the second processing module 13 will send notification message to the target terminal via notification server such as message push server in APNS. After the user opens the corresponding application in the target terminal foreground, specific news or to-do list data will be sent to the target terminal and displayed to the user by the target terminal via the application program.

Embodiment of the present disclosure may pass the detection on whether the signaling channel connected with the user terminal is connected, and when connected, the application server will send a notification message to user terminal directly, when disconnected, it may require the server for sending notification message to the user terminal to send notification message to the user the terminal, which may share part of notification processing burdens from the server for sending notification message to the user terminal and be better to reduce the delay of notification message preferably and avoid the failed transmission of notification message. Furthermore, please see FIG. 6 again, it is the structure diagram of another server configured to push notification message in the embodiment of the present disclosure, the server in the embodiment of the present disclosure may be the application server 1 in corresponding embodiment of above FIG. 4, and the server in the embodiment of the present disclosure includes the detection module 11 in corresponding embodiment of above FIG. 5, the first processing module 12 and the second processing module 13, in the embodiment of the present disclosure, the server further includes:

The first determination module 14 is configured to determine whether the replied confirmation message of the notification in response to the notification message is received within the preset time period after the first processing module 12 sends notification message to the target terminal;

The second processing module 13 is also configured to send the generated notification request on the corresponding account of target terminal to the notification server when the replied confirmation message of notification by the target terminal within the preset time period so that the notification server may push notification message to the target terminal according to the notification request.

After the first processing module 12 sends the notification message to the target terminal, the notification message will be not sent correctly to the target terminal due to the network or the user terminal. Thus, the reception confirmation mechanism may be set in the embodiment of the present disclosure, i.e. after the user terminal receives the notification message (pseudo notification message) sent directly from the application server via signaling channel, the confirmation message of the notification may be replied to the application server. After receiving the notification message sent directly by the application server through the signaling channel and successfully display the prompts to the user, the user terminal may also reply confirmation message of notification to the application server. If the notification message is not received or having abnormal prompts f after receiving, the user terminal will not auto-response confirmation message of notification.

When the first determination module 14 determines the reception of confirmation message replied from the target terminal in response to the notification message, is the same with the existing technology, it will send the corresponding information or to-do list data, and if the first determination module 14 determines not receive the confirmation message of notification, the generated notification request via the second processing module 13 on the corresponding account of target terminal will be sent to the notification server so that the notification server may push notification message to the target terminal according to the notification request.

Figure 6:
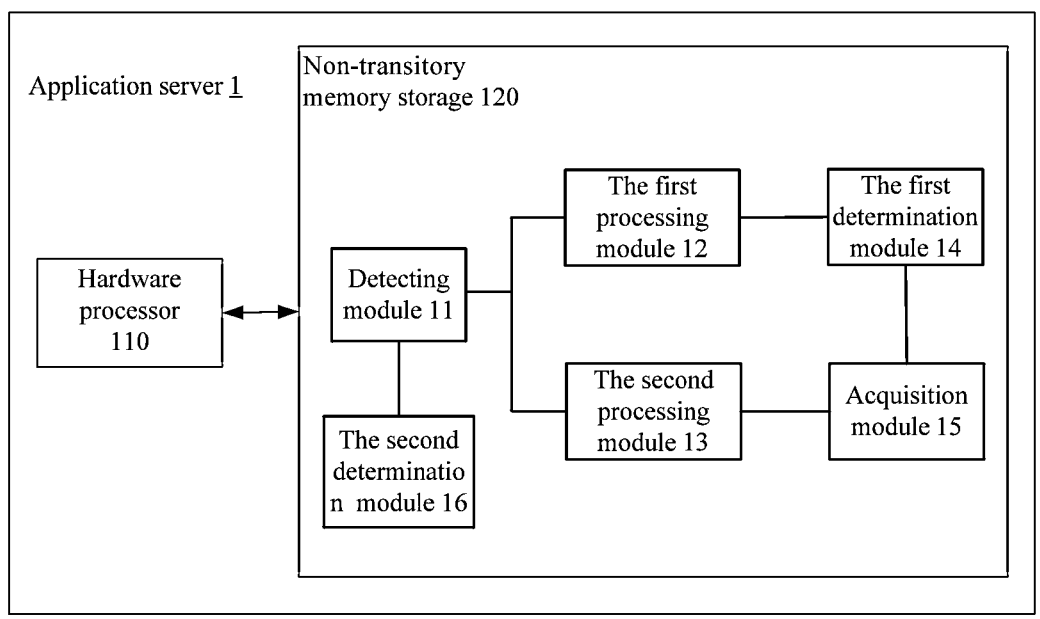
FIG. 6 is the structural diagram of another server used for pushing notification message of the embodiment of this disclosure.

Further optionally, see FIG. 6, the server also includes:

Acquisition module is configured to acquire notification content data on the corresponding account of the target terminal;

The second processing module 13 is configured to generate the notification request on corresponding account of target terminal and send the notification request on notification content data including corresponding account of target terminal to the notification server.

The notification content data obtained by the acquisition module 15 include: obtaining the notification content that the user has a new message, or the notification content that the users has some to-do list. The second processing module 13 sends the corresponding notification content data to the APNS and other notification server, and the notification server generates the corresponding notification message which will be sent to the target terminal.

Further optionally, see FIG. 6 again, the detection module 11 may include:

The determination unit is configured to determine whether the heartbeat connection with the target terminal is normal when detecting the need to push notification message to the target terminal;

The confirmation unit is configured to determine the signaling channel state of the current and the target terminal is in connected state when the heartbeat connection is abnormal, otherwise, determining as disconnected state.

Further optionally, see FIG. 6 again, the devices of this disclosure embodiment may further include:

The second determination module 16 is configured to determine whether received the confirming message of the notification replied by the target terminal in response to the notification message within the preset time period;

The detection module 11 is also configured to detect the signaling channel state with the target terminal when the determination result of second determination module 16 is the received confirmation message of notification from the target terminal;

The first processing module 12 is also configured to send notification message to the target terminal via the signaling channel, if it is in connected state.

The second processing module 13 may send the notification message to the target terminal via notification server, after that, the terminal feedback mechanism may also be configured to determine whether the user terminal receives the notification message, when the second processing module 16 determines not receive the confirmation message of notification used for feedback from the target terminal, the state of signaling channel connected with target terminal may also be re-detected via the detecting module 11, since the corresponding instant messaging applications in the target terminal may possibly launch connected signaling (i.e. heartbeat signaling) at this time in the signaling channel, therefore, the detecting module 11 may detect and confirm the state of signaling channel connected with the target terminal as connected state, the first processing module 12 may send this notification message to the target terminal via the signaling channel.

Embodiment of the present disclosure may pass the detection on whether the signaling channel connected with the user terminal is connected, and when connected, the application server will send a notification message to user terminal directly, when disconnected, it may require the server for sending notification message to the user terminal to send notification message to the user terminal, which may share part of notification processing burdens from the server for sending notification message to the user terminal and preferably reduce the delay of notification message and avoid the failed transmission of notification message. Furthermore, after the notification message is sent, it may determine whether the notification message is successfully sent based on whether the confirmation message feed back from the user terminal is received, after a successful sending, the notification processing may be made, then after it is confirmed the sending is not successful, the server sending notification message to user terminal may send notification message to the user terminal, which better ensures the notification message may be sent to the user terminal.

Figure 7:
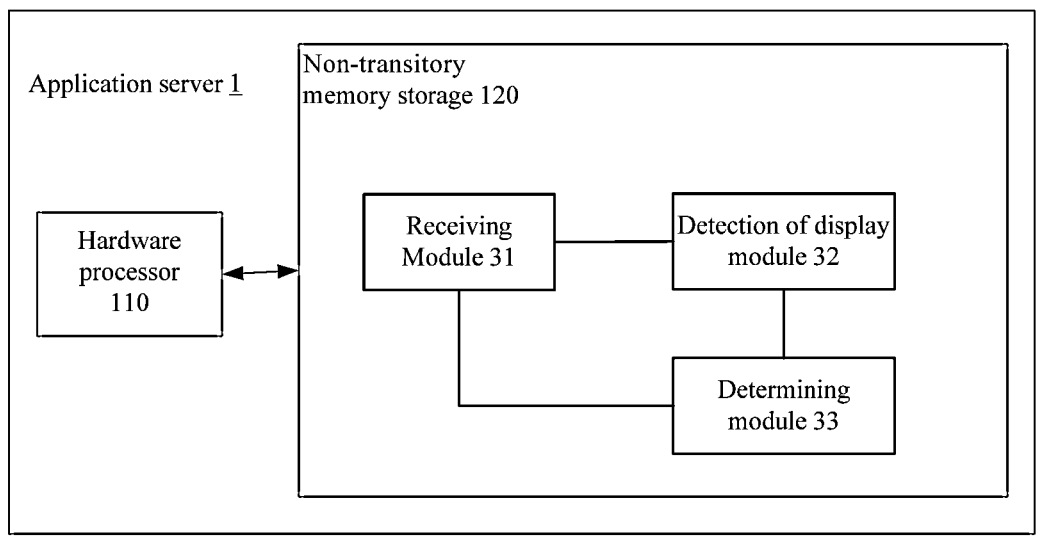
FIG. 7 is the structural diagram of a user terminal used for notification message prompting of the embodiment of this disclosure.

Please see FIG. 7 again, it is the structure diagram of one user terminal configured to notification message prompt in the embodiment of the present disclosure, the user terminal in the embodiment of the present disclosure may be the user terminal 3 in the corresponding embodiment of above FIG. 4. For example, the user terminal in the embodiment of the present disclosure includes:

Receiving module 31 is configured to receive the notification message sent from application server, the notification message is the notification message sent from the application server via signaling channel connected with the present terminal;

Detection display module 32 is configured to prompt information according to the data content structure of the notification message once detected the client application is in the state of running in client background and pop up this prompt information to the user.

The receiving module 31 may determine whether the notification message is that sent to the terminal by the corresponding application server via the signaling channel connected with the terminal according to the equipment identification of notification message sending terminal such as IP address and transmission channel.

If detecting the corresponding client application is in the foreground running state, the user terminal will not display the notification message, that is, the user is currently in the user interface of the corresponding client application for the application server, for example, in the user session interface of corresponding instant messaging application, the detection display module 32 will directly display the received specific information or the specific to-do list data corresponding to this notification message sent from application server to the user.

And if it is the corresponding instant messaging application and the user terminal is currently in screen lock state or the user is currently processing other events, the user terminal will run in background and the detection module 32 need to construct a simple prompt information tips according to the data content of the notification message and pop up the prompt information prompt to the user.

Further optionally, see FIG. 7 again, the user terminal may further include:

Determining module 33 is configured to send confirming message of the notification to the application server after receiving the notification message sent by the application server.

And if the receiving module 31 receives the notification message sent from notification server such as APNS configured to push notification message to corresponding account of the target terminal, the processing flow of the received notification message is the same as the existing technology, which will be not repeated herein.

The user terminal may directly receive notification message via the signaling channel, which may better ensure timely tip of the notification message and the feedback mechanism further ensures when the user terminal does not receive the notification message in signaling channel, it may also receive the notification message from the application server via server configured to send notification message to the user terminal, may further ensure the timely tip of notification message, better reduce the delay of notification message and avoid the failed transmission of notification message.

Persons having ordinary technical skills in this field understand and achieve all or part of the processes in the method of the above embodiments, which may be completed through a computer program instructing-related hardware including a hardware processor. The program may be stored in a computer readable storage medium, when the program is running; it may include the process of embodiment of above methods. Wherein, the storage medium may be magnetic disk, optical disk, read only memory (Read-Only Memory, ROM) or random access memory (Random Access Memory, RAM), etc.

The above disclosed content is only preferred embodiments of the present disclosure and certainly cannot be taken to limit the right scope of the present disclosure, therefore, the equivalent changes made as claimed in the right claim of the present disclosure is still the range covered by the present disclosure.

What is claimed is:

1. A method for pushing notification messages, comprising:
   generating, by an application server, a notification message including information receivable by an instant messaging application on a target terminal, the notification message corresponding to an application account of the instant messaging application stored on the application server;
   detecting, by the application server, based on a heartbeat message communicated over a signaling channel between the application server and the target terminal, a state of the signaling channel between the application server and the target terminal in response to a trigger to push the notification message to the target terminal, the heartbeat message corresponding to the application account of the instant messaging application;
   sending, by the application server, the notification message from the application server to the target terminal via the signaling channel instead of a notification server in response to the signaling channel being in a connected state; and
   sending, by the application server, in response to the signaling channel being in a disconnected state, a notification request comprising the notification message to the notification server instead of the target terminal, the notification server configured to push the notification message to the instant messaging application of the target terminal via a messaging push service in response to receipt of the notification request.

2. The method of claim 1, further comprising:
determining, by the application server and in response to the signaling channel being in the connected state, whether the application server receives a confirmation message from the target terminal in response to the notification message within a preset time period; and
sending the notification request to the notification server in response to an absence of the confirmation message from the target terminal within the preset time period.

3. The method of claim 1, comprising:
determining, by the application server, in response to sending the notification request to the notification server, whether the application server receives a confirmation message from the target terminal within a preset time period;
detecting, by the application server, the state of the signaling channel between the application server and the target terminal in response to an absence of the confirmation message; and
sending, by the application server, the notification message to the target terminal via the signaling channel in response to the signaling channel being in the connected state and the absence of the confirmation message.

4. The method of claim 1, wherein generating the notification request further comprises:
obtaining, by the application server, notification content data based on the application account corresponding to the target terminal and generating the notification request to include the notification content data; and
sending the notification request to the notification server, wherein the notification request comprises notification content data on the corresponding account of the target terminal.

5. The method of claim 4, wherein detecting the state of the signaling channel further comprises:
determining, by the application server, presence of a heartbeat connection with the target terminal;
determining that the state is in the connected state when the heartbeat connection is present; and
determining that the state is in the disconnected state when the heartbeat connection is absent.

6. The method of claim 1, further comprising the step of detecting the state of the signaling channel in response to receipt of a login request from the instant messaging application on the target terminal.

7. The communication system of claim 1, further comprising:
opening the signaling channel between the application server and the target terminal in response to receipt of a login request from the target terminal.

8. An application server comprising a hardware processor and a non-transitory storage medium accessible to the hardware processor, the non-transitory storage medium comprising instructions executable by the hardware processor, the instructions comprising:
instructions to generate a notification message corresponding to an application account for an instant messaging application of a target terminal accessible to the application server, the application account stored on the application server;
instructions to receive a heartbeat message from the target terminal, the heartbeat message comprising a status of the instant messaging application associated with the application account;
instructions to detect a state of a signaling channel between the application server and the instant messaging application of the target terminal in response to a trigger to push the notification message to the target terminal;
instructions to send the notification message to the target terminal via a message push service of a notification server separate from the application server in response to the signaling channel being in a disconnected state; and
instructions to send, in response to the signaling channel being in a connected state, the notification message to the target terminal via the signaling channel instead of the message push service of the notification server.

9. The application server of claim 8, wherein the non-transitory storage medium further comprise instructions to determine whether a confirmation message from the target terminal is received in response to the notification message within a preset time period.

10. The application server of claim 9, wherein the non-transitory storage medium further comprises instructions to send the notification message a second time, the notification message sent the second time to the notification server instead of to the target terminal in response to the confirmation message from the target terminal not being received within the preset time period.

11. The application server of claim 9, wherein the non-transitory storage medium further comprises:
instructions to detect the state of the signaling channel in response to an absence of the confirmation message from the target terminal; and
instructions to send the notification message to the target terminal through the signaling channel in response to the absence of the confirmation message and in response to the signaling channel being in the connected state.

12. The application server of claim 9, wherein the non-transitory storage medium further comprises instructions executable to
establish a connection with the target terminal on the signaling channel in response to an absence of the confirmation message after a first preset time period,
send the notification message to the target terminal through the signaling channel in response to establishment of the connection with the target terminal, and
send the notification message to the notification server instead of to the target terminal after a second preset time period in response to a failure to establish the connection with the target terminal.

13. The application server of claim 8, wherein the instructions executable to generate the notification message further comprise:
instructions to acquire notification content data about the application account corresponding to the target terminal.

14. The application server of claim 8, wherein the instructions to detect a state of a signaling channel further comprise:
instructions to determine that the state of the signaling channel is in the connected state in response to the target terminal being responsive; and
instructions to determine that the state of the signaling channel is in the disconnected state in response to the target terminal being unresponsive.

15. The application server of claim 8, further comprising a database comprising the application account.

16. A communication system comprising: an application server and a notification server, the application server configured to receive a login request from an instant message application on a target terminal, the instant message application corresponding to an application account stored on the application server, the application server further configured, in response to the login request, to:

generate a notification message corresponding to the application account, the notification message including information displayable on the target terminal by the instant message application logged into the application server;

open a signaling channel between the application server and the target terminal;

receive, on the signaling channel between the application server and the target terminal, a heartbeat message generated by the instant message application, the heartbeat message corresponding to the application account and indicating a connection status;

detect, based on the heartbeat message, a state of the signaling channel between the application server and the target terminal in response to a trigger to push the notification message to the target terminal;

send, in response to the signaling channel being in a connected state, the notification message from the application server to the target terminal through the signaling channel instead of a messaging push service executed on a notification server; and send the notification message from the application server to the target terminal via the notification server instead of the signaling channel in response to the signaling channel being in a disconnected state, wherein the notification server is configured to communicate with the application server independent of the signaling channel, the notification server further configured to push the notification message to the target terminal via the messaging push service in response to receipt of the notification message from the application server.

17. The communications system of claim 16, wherein the application server is further configured to determine whether a confirmation message responsive to the notification message is received from the target terminal within a preset time period of the notification message being sent to the target terminal via the signaling channel and the application server further configured to send the notification message to the notification server in response to the confirmation message not being received from the target terminal within the preset time period.

18. The communication system of claim 16, wherein the application server is further configured to determine whether a confirmation message responsive to the notification message is received from target terminal within a preset time period, wherein the application server is further configured to send the notification message to the notification server in response to the confirmation message not received within the preset time period.

19. The communication system of claim 16, further comprising a user terminal configured to send a confirmation message to the application server in response to receipt of the notification message, wherein the target terminal comprises the user terminal.

20. The communication system of claim 16, wherein the application server is separated from the notification server by a physical network.

\* \* \* \* \*